(12) United States Patent
Horng et al.

(10) Patent No.: US 6,845,000 B2
(45) Date of Patent: Jan. 18, 2005

(54) LIMITING CIRCUIT FOR A BRUSHLESS DC MOTOR

(75) Inventors: Alex Horng, Kaohsiung (TW); Ta-Lun Ko, Fengshan (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 10/633,519

(22) Filed: Aug. 5, 2003

(65) Prior Publication Data

US 2004/0109268 A1 Jun. 10, 2004

(30) Foreign Application Priority Data

Dec. 5, 2002 (TW) ........................................ 91220027 U

(51) Int. Cl.[7] .............................................. H02H 3/00
(52) U.S. Cl. ....................... 361/93.9; 361/93.4; 318/806
(58) Field of Search ......................... 307/125; 318/254, 318/257, 284, 681, 434, 806; 323/268, 222; 361/100, 101, 103, 106, 111, 115, 119, 18, 56, 58, 92, 93.1, 93.4, 93.7, 93.9, 98

(56) References Cited

U.S. PATENT DOCUMENTS

| | | | | |
|---|---|---|---|---|
| 5,130,636 A | * | 7/1992 | Kumar et al. | 323/278 |
| 5,225,751 A | * | 7/1993 | Kusano et al. | 318/434 |
| 5,337,208 A | * | 8/1994 | Hossner | 361/93.7 |

* cited by examiner

*Primary Examiner*—Ronald Leja
(74) *Attorney, Agent, or Firm*—Bacon & Thomas, PLLC

(57) ABSTRACT

A limiting circuit for a brushless dc motor in accordance with the present invention comprises a first transistor, a second transistor, a first resistor and a second resistor. The first transistor, the second transistor, the first resistor and the second resistor are arranged in complementary connection to constitute the limiting circuit which has a first terminal connected to a power source and a second terminal connected to a motor drive circuit.

7 Claims, 2 Drawing Sheets

US 6,845,000 B2

LIMITING CIRCUIT FOR A BRUSHLESS DC MOTOR

BACKGROUND OF THE INVENTION

1. Field of the Invention

The present invention is related to a limiting circuit for a brushless dc motor. More particularly, the present invention is related to a simplified limiting circuit for a brushless dc motor.

2. Description of the Related Art

A motor speed will be gradually reduced due to covering it with dust. Accordingly, an electric current passing through a motor coil is rapidly risen and the power consumption is thus increased. Also, as a fan wheel is jammed, an electric current passing through the motor coil is rapidly risen and the power consumption is thus increased. Great power consumption can generate high temperature and heat that may result in cracks in an insulating material of wire of the motor coil.

In order to prevent from passing of a greater electric current through the motor coil during abnormal operation, there is an auto restart function build in a drive IC. When the motor is operated abnormally, a series of pulsed signals are used to allow a current to pass through the motor coil a short-term time, such as a few seconds, and thus a successive passage of a greater electric current is prevented. After passing an electric current for a short term, the electric current on the motor coil is interrupted if an abnormal operation of the motor coil is not removed. And the drive IC produces a series of pulsed signals to restart the motor coil shortly after the interruption of the electric current on the motor coil. The auto restart function may be operated repeatedly as long as the abnormal operation of the motor coil remains. However, the auto restart function may still allow a pulsed electric current through the motor coil to thereby consume its maximum power when the motor is restarted.

Briefly, there is a need for an effective limit which can avoid great power consumption and high temperature when the motor speed is reduced or the fan wheel is jammed.

The present invention intends to provide a limiting circuit for a brushless dc motor, which includes a simplified limiting circuit connected to a motor drive circuit to thereby limit an electric current supplied from a power source in such a way to mitigate and overcome the above problem.

SUMMARY OF THE INVENTION

The primary objective of this invention is to provide a limiting circuit for a brushless dc motor, which includes a simplified limiting circuit connected to a motor drive circuit to thereby limit a current supplied from a power source. Consequently, it may prolong useful life of the motor.

The secondary objective of this invention is to provide the limiting circuit for a brushless dc motor, which includes a simplified limiting circuit to thereby simplify the entire structure of the motor.

The limiting circuit for a brushless dc motor in accordance with the present invention comprises a first transistor, a second transistor, a first resistor and a second resistor. The first transistor, the second transistor, the first resistor and the second resistor are arranged in complementary connection to constitute the limiting circuit which has a first terminal connected to a power source and a second terminal connected to a motor drive circuit.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 2:
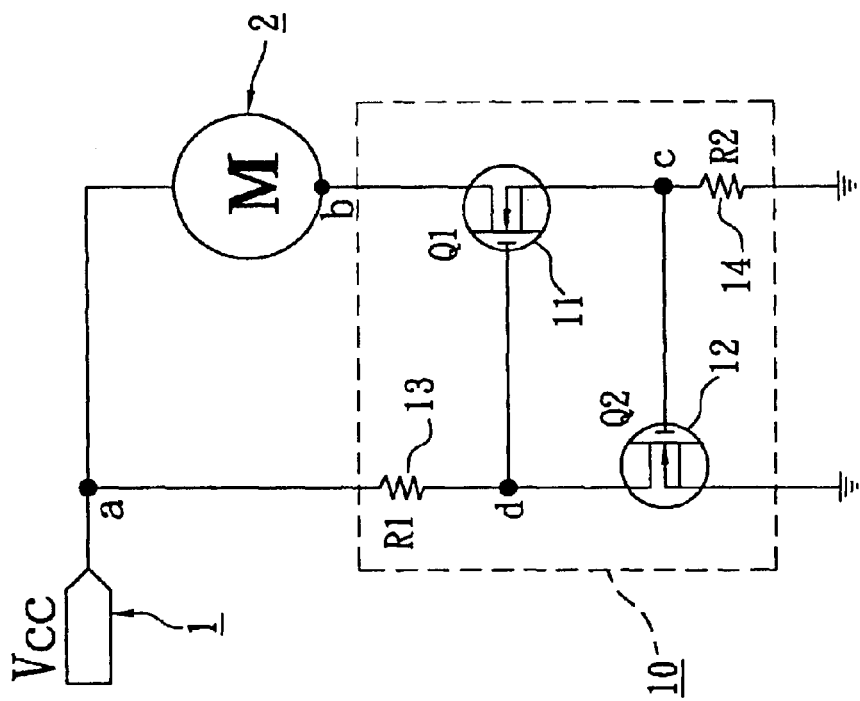
FIG. 2 is a schematic circuitry of a limiting circuit for a brushless dc motor in accordance with a second embodiment of the present invention.

Referring now to the drawings, there are four embodiments of the present invention shown therein, which include generally a motor drive circuit member and a limiting circuit member.

Figure 1:
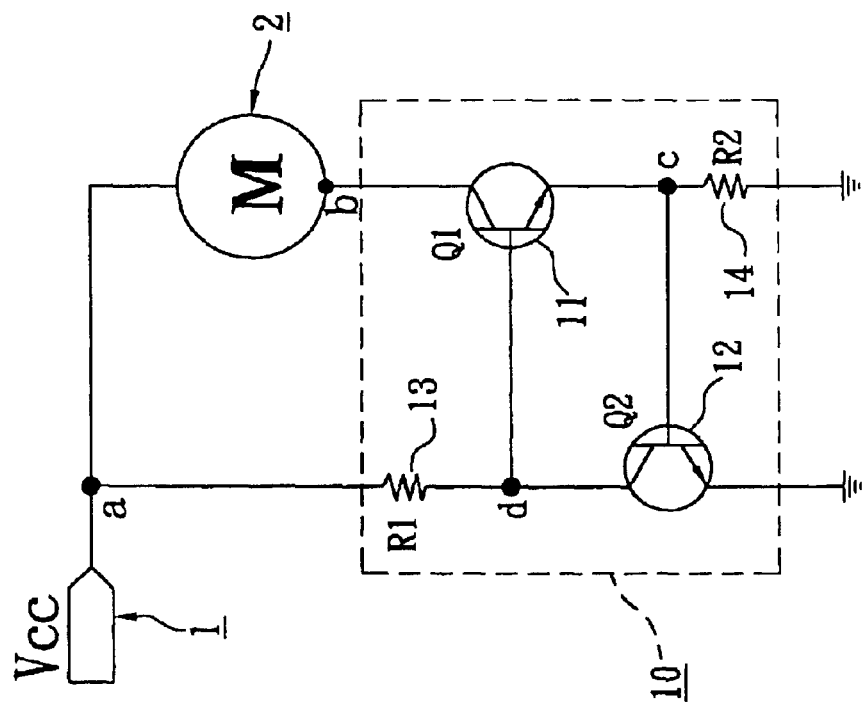
FIG. 1 is a schematic circuitry of a limiting circuit for a brushless dc motor in accordance with a first embodiment of the present invention.

Referring initially to FIG. 1, it illustrates a schematic circuitry of a limiting circuit for a brushless dc motor in accordance with a first embodiment of the present invention.

Referring again to FIG. 1, a limiting circuit 10 in accordance with the first embodiment is connected with a power source (Vcc) 1 and a motor drive circuit 2. The limiting circuit 10 includes a first transistor 11, a second transistor 12, a first resistor 13 and a second resistor 14. The limiting circuit 10 has a first terminal (1) connected to the power source 1, and a second terminal (b) connected to the motor drive circuit 2. The first resistor 13 serves as the first terminal (1) while a base of the first transistor 11 serves as the second terminal (b). Preferably, the first transistor 11 and the second transistor 12 are NPN type transistors which serve as switches.

Referring again to FIG. 1, a series connection of the first transistor 11 with the first resistor 13 and a series connection of the second transistor 12 with the second resistor 14 are arranged in complementary connection to constitute the limiting circuit 10. The first resistor 13 has a first end connected to the power source 1, and a second end connected to a base of the first transistor 11 and a collector of the second transistor 12. Meanwhile, the second resistor 14 has a first end connected to an emitter of the first transistor 11 and a base of the second transistor 12, and a second end connected to the ground. In operation, the first transistor 11 serves as a first switch connected to the motor drive circuit 2 and the second transistor 12 serves as a second switch adapted to control the first transistor 11 for turning on or off.

Referring again to FIG. 1, when the motor drive circuit 2 is operated normally, the power source 1 supplies a bias through the first resistor 13 to the base of the first transistor 11. When the bias of the base of the first transistor has risen greater than a predetermined voltage, the first transistor 11 is saturated. Since the power source 1 supplies an electric current with a normal voltage to pass through the motor drive circuit 2, the first transistor 11 and the second resistor 14 successively, an end point (c) of the second resistor 14 provides a bias that is inadequate to turn on the second transistor 12. Consequently, the limiting circuit 10 is unable to conduct an electric current from the power source 1 to the ground through the first resistor 13 and the second transistor 12. Alternatively, a completed electric current supplied from the power source 1 flows through the motor drive circuit 2, the first transistor 11 and the second transistor 14 successively.

Referring again to FIG. 1, when the motor drive circuit 2 is operated abnormally or jammed, an electric current supplied from the power source 1 rises rapidly. Since the power source 1 supplies a greater electric current with a high voltage to pass through the motor drive circuit 2, the first transistor 11 and the second resistor 14 successively, an end point (c) of the second resistor 14 provides a bias that has risen rapidly and is now adequate to turn on the second transistor 12. Once the bias of the end point (c) of the second resistor 14 has risen greater than a predetermined voltage, the second transistor 12 is saturated and then a base of the first transistor 11 has a decrease in voltage. When the bias of the base of the first transistor 11 is lower than a predetermined voltage, the first transistor 11 turns off. Consequently, the limiting circuit 10 completely connects an electric current from the power source 1 to the ground through the first resistor 13 and the second transistor 12. Thereby, a greater electric current supplied from the power source 1 cannot flow through the motor drive circuit 2, the first transistor 11 and the second resistor 14 successively, and the motor drive circuit 2 is cut off.

Referring again to FIG. 1, as the first transistor 11 is turned off, the bias of the base of the second transistor 12 and the end point (c) of the second resistor 14 may be decreased rapidly. Once the bias of the base of the second transistor 12 is lower than a predetermined voltage, the second transistor 12 is turned off. In this circumstance, since the second resistor 12 is turned off, the bias of the base of the first transistor 11 rises again. Once the bias of the base of the first transistor 11 is greater than a predetermined voltage, the first transistor is turned on again.

Referring again to FIG. 1, when the first transistor 11 is turned on again, the bias of the end point (c) of the second resistor 14 is also able to turn on the second transistor 12 again if the electric current supplied from the power source is still high. Meanwhile, a bias of an end point (d) of the first resistor 13 is synchronously decreased to turn off the first transistor 11. Consequently, the limiting circuit 10 completely reconnects an electric current from the power source 1 to the ground through the first resistor 13 and the second transistor 12. Therefore, the limiting circuit 10 actuates the first transistor 11 and the second transistor 12 repeatedly until the electric current and the voltage of the power source 1 are stable and normal. Namely, the operation of the motor drive circuit 2 is returned to a normal state.

Figure 4:
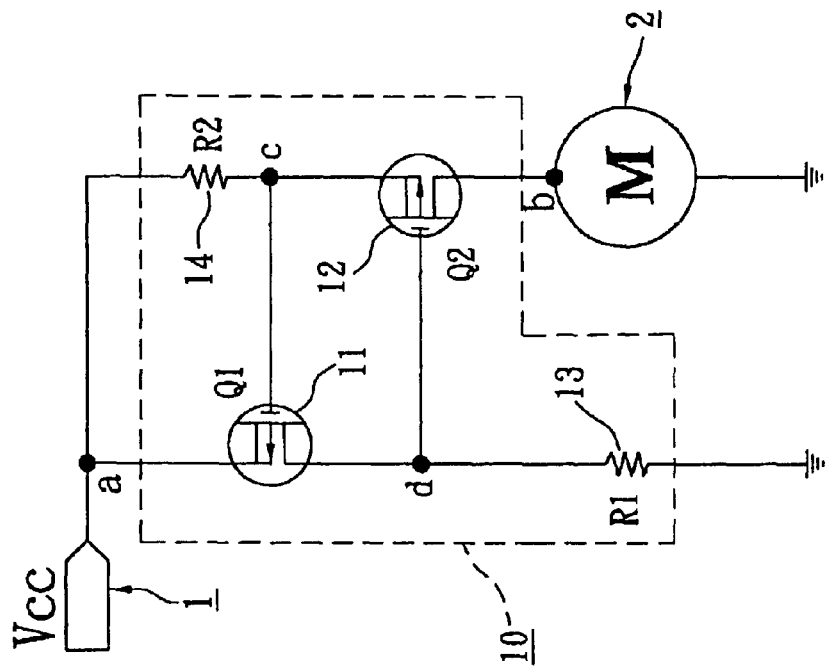
FIG. 4 is a schematic circuitry of a limiting circuit for a brushless dc motor in accordance with a fourth embodiment of the present invention.
Figure 3:
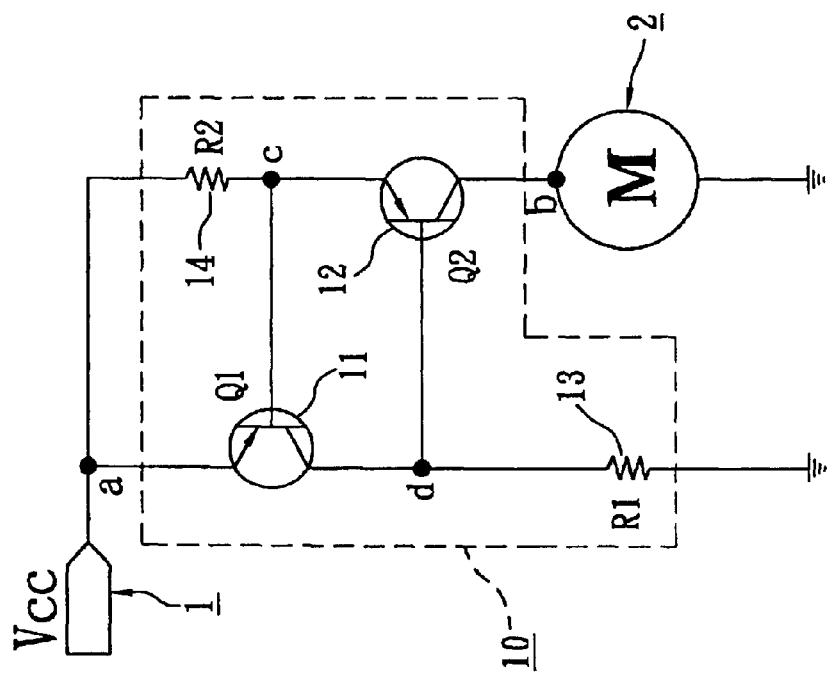
FIG. 3 is a schematic circuitry of a limiting circuit for a brushless dc motor in accordance with a third embodiment of the present invention.

Referring to FIGS. 2 through 4, reference numerals of the second through fourth embodiments of the present invention have applied the identical numerals of the first embodiment. The construction of the limiting circuit in accordance with the second through fourth embodiments of the present invention have similar configuration and same function as that of the first embodiment and the detailed descriptions may be omitted.

Turning to FIG. 2, it illustrates a schematic circuitry of a limiting circuit for a brushless dc motor in accordance with a second embodiment of the present invention.

Referring to FIG. 2, a limiting circuit 10 in accordance with the second embodiment is connected with a power source (Vcc) 1 and a motor drive circuit 2. The limiting circuit 10 includes a first transistor 11, a second transistor 12, a first resistor 13 and a second resistor 14. In comparison with the first embodiment, each of the first transistor 11 and the second transistor 12 of the second embodiment adopts a P type field-effect transistor instead of a NPN type transistor.

Turning to FIG. 3, it illustrates a schematic circuitry of a limiting circuit for a brushless dc motor in accordance with a third embodiment of the present invention.

Referring to FIG. 3, a limiting circuit 10 in accordance with the third embodiment is connected with a power source (Vcc) 1 and a motor drive circuit 2. The limiting circuit 10 includes a first transistor 11, a second transistor 12, a first resistor 13 and a second resistor 14. The limiting circuit 10 has a first terminal (a) connected to the power source 1, and a second terminal (b) connected to the motor drive circuit 2. An emitter of the first transistor 11 serves as the first terminal (a) while a collector of the second transistor 12 serving as the second terminal (b). Preferably, the first transistor 11 and the second transistor 12 are PNP type transistors which serve as switches.

Referring again to FIG. 3, in operation, the second transistor 12 serves as a first switch connected to the motor drive circuit 2 and the first transistor 11 serves as a second switch adapted to control the second transistor 12 for turning on or off.

Referring again to FIG. 3, when the motor drive circuit 2 is operated normally, the first transistor 11 is turned off and the second transistor 12 is turned on. Consequently, a completed electric current supplied from the power source 1 flows through the second resistor 14, the second transistor 12 and the motor drive circuit successively.

Referring again to FIG. 3, when the motor drive circuit 2 is operated abnormally or is jammed, an electric current supplied from the power source 1 rises rapidly. As the greater electric current is passed through the second resistor 14, a bias of an end point (c) of the second resistor 14 is constantly decreased and adequate to turn on the first transistor 11. Once the bias of the end point (c) of the second resistor 14 is decreased lower than a predetermined voltage, the first transistor 11 is saturated and then a base of the second transistor 12 has an increase in voltage. When the bias of the based of the second transistor 12 is greater than a predetermined voltage, the second transistor 12 turns off. Consequently, the limiting circuit 10 completely connects an electric current from the power source 1 to the ground through the first transistor 11 and the first resistor 13. Thereby, a greater electric current supplied from the power source 1 cannot flow through the second resistor 14, the first transistor 11 and the motor drive circuit 2 successively, and the motor drive circuit 2 is cut off.

Referring again to FIG. 3, as the second transistor 12 is turned off, the bias of the base of the first transistor 11 and the end point (c) of the second resistor 14 may be increased rapidly. Once the bias of the base of the first transistor 11 is greater than a predetermined voltage, the first transistor 11 is turned off. In this circumstance, since the first resistor 11 is turned off, the bias of the base of the second transistor 12 is decreased again. Once the bias of the base of the second transistor 12 is lower than a predetermined voltage, the second transistor 12 is turned on again.

Referring again to FIG. 3, when the second transistor 12 is turned on again, the bias of the end point (c) of the second resistor 14 is also able to turn on the first transistor 11 again if the electric current suppled from the power source is still high. Meanwhile, a bias of an end point (d) of the first resistor 13 is synchronously increased to turn off the second transistor 12. Consequently, the limiting circuit 10 reconnects an electric current from the power source 1 to the ground through the first transistor 11 and the first resistor 13. Therefore, the limiting circuit 10 actuates the first transistor 11 and the second transistor 12 repeatedly until the electric current and the voltage of the power source 1 are stable and normal. Namely, the operation of the motor drive circuit 2 is returned to a normal state.

Turning to FIG. 4, it illustrates a schematic circuitry of a limiting circuit for a brushless dc motor in accordance with a fourth embodiment of the present invention.

Referring to FIG. 4, a limiting circuit 10 in accordance with the fourth embodiment is connected with a power source (Vcc) 1 and a motor drive circuit 2. The limiting circuit 10 includes a first transistor 11, a second transistor 12, a first resistor 13 and a second resistor 14. In comparison with the third embodiment, each of the first transistor 11 and the second transistor 12 of the second embodiment adopts a N type field-effect transistor instead of a PNP type transistor.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A limiting circuit for a brushless dc motor, comprising:
    a first transistor and a second transistor arranged in complementary connection, the first transistor connected to a motor drive circuit and regarded as a first switch, and the second transistor regarded as a second switch and adapted to control the first transistor;
    a first resistor provided with a first bias for the first switch to thereby turn on or off the motor drive circuit; and
    a second resistor provided with a second bias for the second switch to thereby turn on or off the first switch;
    wherein when an electric current supplied from a dc power source has risen rapidly, the second switch is turned on so that the first switch is turned off to thereby cut off the motor drive circuit from the dc power source; and
    wherein the limiting circuit thereby alternately operates the first switch and then the second switch in succession until the electric current of the dc power source is stable.

2. The limiting circuit for a brushless dc motor as defined in claim 1, wherein the transistors are NPN type transistors.

3. The limiting circuit for a brushless dc motor as defined in claim 1, wherein the transistors are P type field-effect transistors.

4. The limiting circuit for a brushless dc motor as defined in claim 1, wherein the transistors are PNP type transistors.

5. The limiting circuit for a brushless dc motor as defined in claim 1, wherein the transistors are N type field-effect transistors.

6. The limiting circuit for a brushless dc motor as defined in claim 1, wherein the limiting circuit has a first terminal connected to the power source, a second terminal is connected to the motor drive circuit, an end of the first resistor forms the first terminal, and an end of the first switch forms the second terminal.

7. The limiting circuit for a brushless dc motor as defined in claim 1, wherein the limiting circuit has a first terminal connected to the power source, a second terminal is connected to the motor drive circuit, an end of the second switch forms the first terminal, and an end of the first switch forms the second terminal.

* * * * *